United States Patent
Jagota

(10) Patent No.: US 9,026,552 B2
(45) Date of Patent: May 5, 2015

(54) SYSTEM AND METHOD FOR LINKING CONTACT RECORDS TO COMPANY LOCATIONS

(75) Inventor: Arun Kumar Jagota, Sunnyvale, CA (US)

(73) Assignee: salesforce.com, inc., San Francisco, CA (US)

( * ) Notice: Subject to any disclaimer, the term of this patent is extended or adjusted under 35 U.S.C. 154(b) by 55 days.

(21) Appl. No.: 13/221,684

(22) Filed: Aug. 30, 2011

(65) Prior Publication Data

US 2012/0059853 A1 Mar. 8, 2012

Related U.S. Application Data

(60) Provisional application No. 61/379,663, filed on Sep. 2, 2010.

(51) Int. Cl.
*G06F 17/30* (2006.01)
*G06Q 10/10* (2012.01)

(52) U.S. Cl.
CPC .... *G06F 17/30861* (2013.01); *G06F 17/30241* (2013.01); *G06Q 10/10* (2013.01); *Y10S 707/944* (2013.01)

(58) Field of Classification Search
CPC .............. G06F 17/30563; G06F 17/30569; G06F 17/30861; G06F 17/30241; G06Q 10/10
USPC ......................... 707/737, 740, 780
See application file for complete search history.

(56) References Cited

U.S. PATENT DOCUMENTS

| | | | |
|---|---|---|---|
| 5,950,193 A * | 9/1999 | Kulkarni | 1/1 |
| 7,099,878 B2 * | 8/2006 | Bruce et al. | 1/1 |
| 7,187,932 B1 * | 3/2007 | Barchi | 455/445 |
| 7,236,970 B1 * | 6/2007 | Winslow | 1/1 |
| 7,634,463 B1 * | 12/2009 | Katragadda et al. | 701/431 |
| 2003/0057270 A1 * | 3/2003 | Collen | 235/375 |
| 2003/0158860 A1 * | 8/2003 | Caughey | 707/200 |
| 2004/0054646 A1 * | 3/2004 | Daniell et al. | 707/1 |
| 2005/0021551 A1 * | 1/2005 | Silva et al. | 707/102 |
| 2006/0026198 A1 * | 2/2006 | Emery et al. | 707/103 R |
| 2009/0271029 A1 * | 10/2009 | Doutre | 700/224 |
| 2010/0106724 A1 * | 4/2010 | Anderson | 707/737 |
| 2011/0219034 A1 * | 9/2011 | Dekker et al. | 707/780 |
| 2011/0258232 A1 * | 10/2011 | Scriffignano et al. | 707/780 |

FOREIGN PATENT DOCUMENTS

WO 03/100635 A1 12/2003

OTHER PUBLICATIONS

International Search Report and Written Opinion in PCT Application No. PCT/US2011/050262 dated Dec. 28, 2011.

(Continued)

*Primary Examiner* — Jorge A Casanova
(74) *Attorney, Agent, or Firm* — Dergosits & Noah LLP; Todd A. Noah

(57) ABSTRACT

A database system and method for linking a received contact to a company location. The received contact includes an external address and identifies a company. The database includes a set of multiple locations for the company. The external address is compared to the addresses stored in the database for the different company locations. If a match is found, the contact is tethered to the location with matching address. If no match is found, a new location is created and added to the set of locations for the company.

19 Claims, 6 Drawing Sheets

(56) References Cited

OTHER PUBLICATIONS

Nagabhushan, et al. "A Fuzzy Symbolic Inference System for Postal Address Component Extraction and Labelling." Fuzzy Systems and Knowledge Discovery Lecture Notes in Computer Science, Jan. 1, 2006, pp. 937-946.

Inakiev et al. "Fuzzy Control Structures in Multiple Parameter Systems: An Application in Handwritten Address Interpretation Systems." IEEE, Jun. 10, 1999, pp. 918-922.

\* cited by examiner

| Street Field | | City Field | | State Field | | Zip Field | | Country Field | |
|---|---|---|---|---|---|---|---|---|---|
| Drive | Dr | Bombay | Mumbai | Western Australia | WA | md-2023 | 2023 | United States | USA |
| Av. | Avenida | Moskva | Moscow | Victoria | VIC | md-1234 | 1234 | SG | Singapore |
| Capitan | Capitán | Copenhagen | kØbenhavn Ø | Distrito Federal | DF | Pl 70-456 | 70-456 | England | United Kingdom |
| Pza | Piazza | Yokohama | Yokohama-shi | Rio De Janeiro | RJ | Pl 76-264 | 76-264 | Great Britain | United Kingdom |
| ⋯⋯ | | ⋯⋯ | | ⋯⋯ | | ⋯⋯ | | ⋯⋯ | |

FIG. 6

SYSTEM AND METHOD FOR LINKING CONTACT RECORDS TO COMPANY LOCATIONS

CROSS-REFERENCES TO RELATED APPLICATIONS

The present application claims benefit under 35 U.S.C. §119(e) of U.S. provisional Application No. 61/379,663, filed on Sep. 2, 2010, entitled "Learning-Based Global Address Fuzzy Matching System," the content of which is incorporated herein by reference in its entirety. The present application is related to co-pending U.S. patent application Ser. No. 13/008,853, filed on Jan. 18, 2010, entitled "System and Method of Matching and Merging Records," the content of which is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The present invention relates generally to database systems, and more particularly to implementing systems and methods of learning-based matching. Using present information management systems (e.g., customer relationship management, or CRM, systems), it is difficult to integrate newly received information (e.g., contact information, company information) with existing information such that related information is appropriately associated and that repetitive, unnecessary, or inconsistent information is discarded. For example, while a contact's address may correspond to an address stored within a database, there may be difficulties in linking the contact with the stored address due to slight inconsistencies in the received address and the stored address.

Further, present information management systems are unable to track updates to information and ensure the quality of stored information. For example, as an employee joins a new company, existing systems are unable to ensure that information related to the employee, the former company, and the new company is up-to-date, complete, coherent, and of high quality, while duplicate and inconsistent information is discarded. Therefore it is desirable to provide systems and methods that overcome the above and other problems.

The subject matter discussed in the background section may not be assumed to be prior art merely as a result of its mention in the background section. Similarly, a problem mentioned in the background section or associated with the subject matter of the background section may not be assumed to have been previously recognized in the prior art. The subject matter in the background section merely represents different approaches, which in and of themselves may also be inventions.

SUMMARY

Various embodiments discussed herein include systems and methods for integrating data into a database system, and more particularly for matching and integrating address data, contact information, and/or company information in a database system such as a multi-tenant database system. For instance, global address matching may be performed to tether a contact to one of the multiple company locations of the contact's company in a database. Embodiments described herein enable logical and efficient integration of information updates and enforce compliance with information quality standards. For instance, some embodiments determine the quality of received data (e.g., through a third party validation service) and perform a matching function for the received data against existing data in order to efficiently integrate the received data of sufficiently good quality or the new information with the existing data.

According to one aspect, a computer-implemented method is provided for matching address data in a database system having a corpus of address information stored therein. The method typically includes receiving external address data for a company of a contact where the company is associated with a set of locations in the database system, determining whether the external address data matches an existing address data of one of the set of locations using fuzzy matching techniques, tethering the contact to the one of the set of locations when the external address data matches the existing address data, and creating a new location for the company using the external address data when the external address data does not match the existing address data. Some or all of the method steps can be implemented in a computer system, e.g., using one or more processors.

In certain aspects, the method includes tethering the contact to the new location upon creation of the new location. In certain aspects, the method using the one or more fuzzy matching techniques includes comparing the external address data with each address data corresponding to each of the set of locations. In certain aspects, each comparison yields a score corresponding to each address pair where each address pair includes the external address data and address data of one of the set of locations.

In certain aspects, the method comparing the external address data with each address data corresponding to each of the set of locations includes comparing each address field of the external address data with each address field of each address data corresponding to each of the set of locations to obtain a first set of field match scores using a learned knowledge table, comparing each address field of the external address data with each address field of each address data corresponding to each of the set of locations to obtain a second set of field match scores using a matching logic, and determining a third set of field match scores by obtaining the higher score for each field between the first and second sets of field match scores, where the external address data is determined to match the existing address data of one of the set of locations when an overall address match score exceeds a threshold value, the overall address match score determined based at least in part on the third set of field match scores.

In certain aspects, the external address data includes a plurality of address fields, each address field representing at least one of a street, a city, a state, a zip code, and a country. In certain aspects, the method also typically includes determining whether the external address data is verified by a third party vendor that provides address validation services. In certain aspects, the method typically includes determining whether the external address data is validated, wherein the contact is capable of being tethered to the one of the set of locations when the external address data is validated. In certain aspects, the external address data is either partial or complete. In certain aspects, the database system is a multi-tenant database system integrating the received address data into the database system.

Other embodiments of the invention are directed to systems and computer readable media associated with methods described herein.

According to yet another aspect, a system for matching address data in a database system having a corpus of address information stored therein. The system typically includes a processor, a network interface, and a memory encoded with program code to be executed by the processor. The memory typically includes program code to receive external address data for a company of a contact, the company associated with a set of locations in the database system, program code to determine whether the external address data matches an existing address data of one of the set of locations using one or more fuzzy matching algorithms, program code to tether the contact to the one of the set of locations when the external address data matches the existing address data, and program code to create a new location for the company using the external address data when the external address data does not match the existing address data.

In certain aspects, the memory encoded with program code further includes program code to determine whether the external address data is validated, wherein the contact is tethered to the one of the set of locations when the external address data is validated and matches the existing address data. In certain aspects, the memory encoded with program code further includes program code to determine whether the external address data is validated, program code to determine a nearest location in the set of locations to the external address data, and program code to tether the contact to the one of the set of locations when the external address data matches the existing address data. In certain aspects, the program code to determine the nearest location in the set of locations to the external address data includes program code to determine a distance between the external address data and address data of each of the set of locations. In certain aspects, each address data includes a plurality of address fields, wherein using the one or more fuzzy matching algorithms includes comparing each address field of the external address data with each address field of the existing address data to obtain a field match score for an address pair comprising the external address data and the existing address data.

According to one aspect, a non-transitory computer-readable medium containing program code executable by a processor in a computer to match address data in a database system having a corpus of address information stored therein is provided. The program code typically includes instructions to receive external address data for a company of a contact, the company associated with a set of locations in the database system, determine whether the external address data matches an existing address data of one of the set of locations using one or more fuzzy matching techniques, tether the contact to the one of the set of locations when the external address data matches the existing address data, and create a new location for the company using the external address data when the external address data does not match the existing address data.

In certain aspects, each address data includes a plurality of address fields, wherein the one or more fuzzy matching techniques includes determining a weighted confidence score for at least one of a portion of the plurality of address fields, the weighted confidence scored determined based on a frequency that the portion of the plurality of address fields has appeared in training sets. In certain aspects, the program code further includes instructions to determine whether the external address data is validated by a third party address validation service, and receive validated address data from the third party address validation service when the external address data is validated, wherein whether the external address data matches the existing address data is determined using the validated address data.

In certain aspects, the external address data includes a plurality of external address fields and the validated address data comprises a plurality of normalized address fields, the program code further including instructions to compare each external address field with a corresponding normalized address field, determine that the external address and the validated address is a training set pair when at least a portion of an external address field and a corresponding portion of a normalized address field are not expressed in a same way, determine a set of alias pairs from the training set pair, the set of alias pairs determined based on the portion of the external address field and its corresponding portion of the normalized address field, and store the set of alias pairs in a learned knowledge table.

In certain aspects, the external address data includes a plurality of external address fields, where the instruction to determine whether the external address data matches an existing address data of one of the set of locations includes instructions to calculate a plurality of field match scores for the external address data and the existing address data using learned knowledge, and calculate a record-level match score for the external address data using the calculated field match scores, wherein the record-level match score indicates a weighted match score between the two address data.

While the present invention is described with reference to an embodiment in which techniques for matching and integrating data in an on-demand enterprise services environment are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

In the following drawings like reference numbers are used to refer to like elements. Although the following figures depict various examples of the invention, the invention is not limited to the examples depicted in the figures.

FIG. 6 conceptually illustrates an example of a learned knowledge table of some embodiments from which a system may utilize in obtaining a field-match score.

DETAILED DESCRIPTION

I. General Overview

Figure 1:
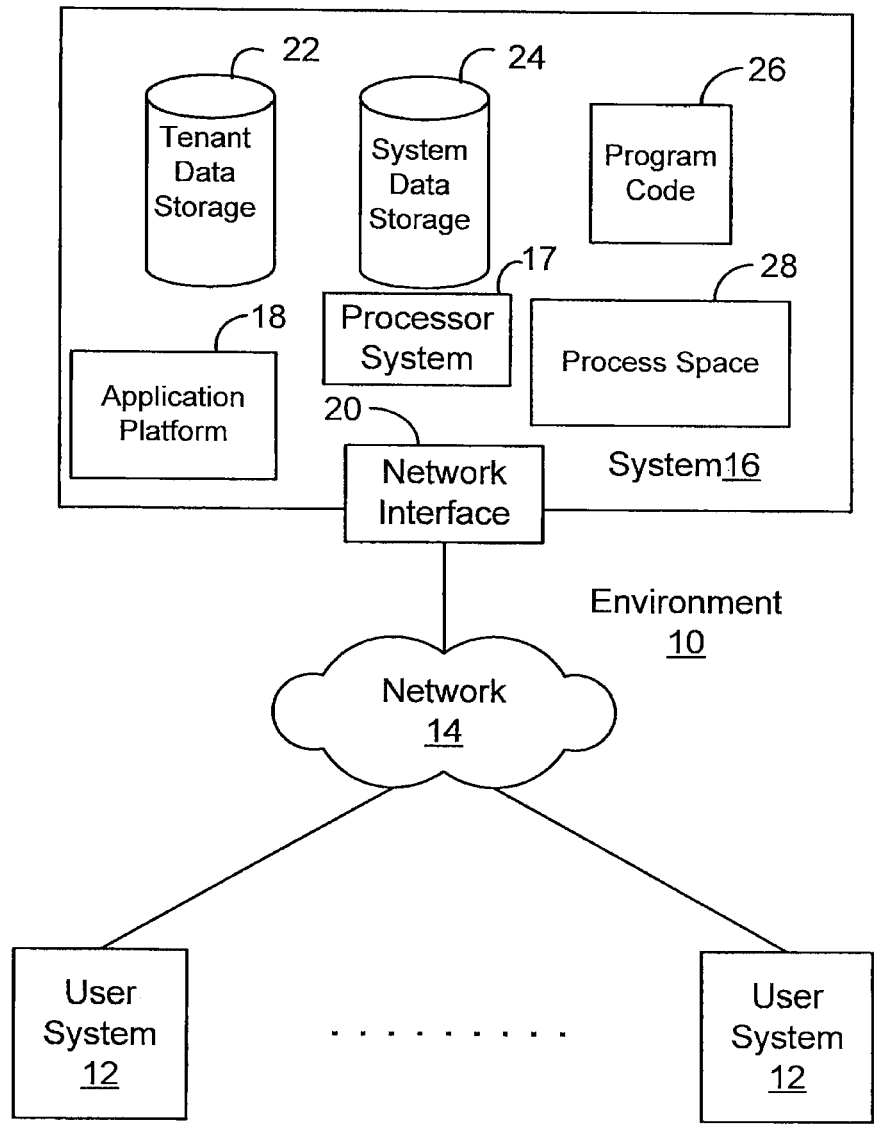
FIG. 1 illustrates a block diagram of an example of an environment wherein some embodiments described herein might be used.

Systems, apparatus, and methods are described for matching and merging address data in a database system. The approaches taught herein enable logical and efficient integration of related information while enforcing quality standards of the integrated information. In some embodiments, data for a new contact (e.g., an external address, an identifier representing the contact's company (e.g., the company's name)) is received. Some embodiments perform a validation of the data or the external address (e.g., by a third party address validation service). In some embodiments, address validation determines if an address actually exists. In some instances, if the data or external address is validated/verified, the data is deemed to be of sufficiently high quality (i.e., each address field or the address data is complete enough such that the address can be identified with an existing address).

The data or external address is matched with preexisting data stored in the database in some embodiments. In some embodiments, the preexisting data is determined using data for the new contact. For instance, some embodiments may use the contact's company name or an identifier representing the contact's company to identify a number of corresponding addresses in the database. Some embodiments then compare the data or the external address with the identified addresses to determine whether there is a match. The contact is associated with one of the identified addresses when it is determined that there is a match between the external address and the one of the identified addresses. Upon determining that a match exists, some embodiments tether the contact to the matching address of the company. This enables logical and efficient integration of related information, the contact and the matching address.

In some embodiments, the matching determination is performed using one or more fuzzy matching techniques e.g., using one or more fuzzy matching processes or algorithms. Fuzzy matching techniques enable matching between data that may be partial or incomplete, erroneous, and/or unconventional. For instance, one may use fuzzy matching techniques to match an incomplete address such as an address lacking a city or a zip code to a validated address (i.e., an existing address). In some embodiments, fuzzy matching enables matching between data that has typos. For instance, one may determine a match between a received address that has misspellings in a street address with a validated address. Further, fuzzy matching techniques that use learning-based matching in some embodiments enable one to use learned knowledge to find a match between data including aliases, spelling mistakes, common misnotions, abbreviations, etc.

By way of example, a user can submit information (e.g., an address of the user's company) or an information update (e.g., an address of a new company that the user recently joined) about the user or an existing contact in the database system (e.g., new location information) to a feed. Once the information has been submitted to the feed, the database system can then automatically collect the information from the feed, match the address information with one or more existing addresses for the user's company identified in the database system, and logically and efficiently merge the information with the existing information, without creating duplicate or inconsistent records.

II. System Overview

In certain embodiments, the address matching methods and systems are implemented in a multi-tenant database system or service. As used herein, the term multi-tenant database system refers to those systems in which various elements of hardware and software of the database system may be shared by one or more customers. For example, a given application server (e.g. running an application process) may simultaneously process requests for a great number of customers, and a given database table may store rows for a potentially much greater number of customers. As used herein, the terms query or query plan refer to a set of steps used to access information in a database system.

FIG. 1 illustrates a block diagram of an environment 10 wherein an on-demand database service might be used. Environment 10 may include user systems 12, network 14, and system 16, which may comprise processor system 17, application platform 18, network interface 20, tenant data storage 22, system data storage 24, program code 26, and process space 28. In other embodiments, environment 10 may not have all of the components listed and/or may have other elements instead of, or in addition to, those listed above.

Environment 10 is an environment in which an on-demand database service exists. User system 12 may be any machine or system that is used by a user to access a database user system. For example, any of user systems 12 can be a handheld computing device, a mobile phone, a laptop computer, a work station, and/or a network of computing devices. As illustrated in FIG. 1 (and in more detail in FIG. 2) user systems 12 might interact via a network 14 with an on-demand database service, which is system 16.

An on-demand database service, such as system 16, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 16" and "system 16" will be used interchangeably herein. A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In an embodiment, on-demand database service 16 may include an application platform 18 that enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level (profile type) may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it may be understood that the networks that the present invention might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP messages to and from an HTTP server at system 16. Such an HTTP server might be implemented as the sole network interface between system 16 and network 14, but other techniques might be used as well or instead. In some implementations, the interface between system 16 and network 14 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 16, shown in FIG. 1, implements a web-based customer relationship management (CRM) system. For example, in one embodiment, system 16 includes application servers configured to implement and execute CRM software applications as well as provide related data, code, forms, webpages and other information to and from user systems 12 and to store to, and retrieve from, a database system related data, objects, and webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIG. 1, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1 include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, embodiments are suitable for use with the Internet, which refers to a specific global internetwork of networks. However, it may be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel Pentium® processor or the like. Similarly, system 16 (and additional instances of an MTS, where more than one is present) and all of their components might be operator configurable using application(s) including computer code to run using a central processing unit such as processor system 17, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 16 is configured to provide webpages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It may also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
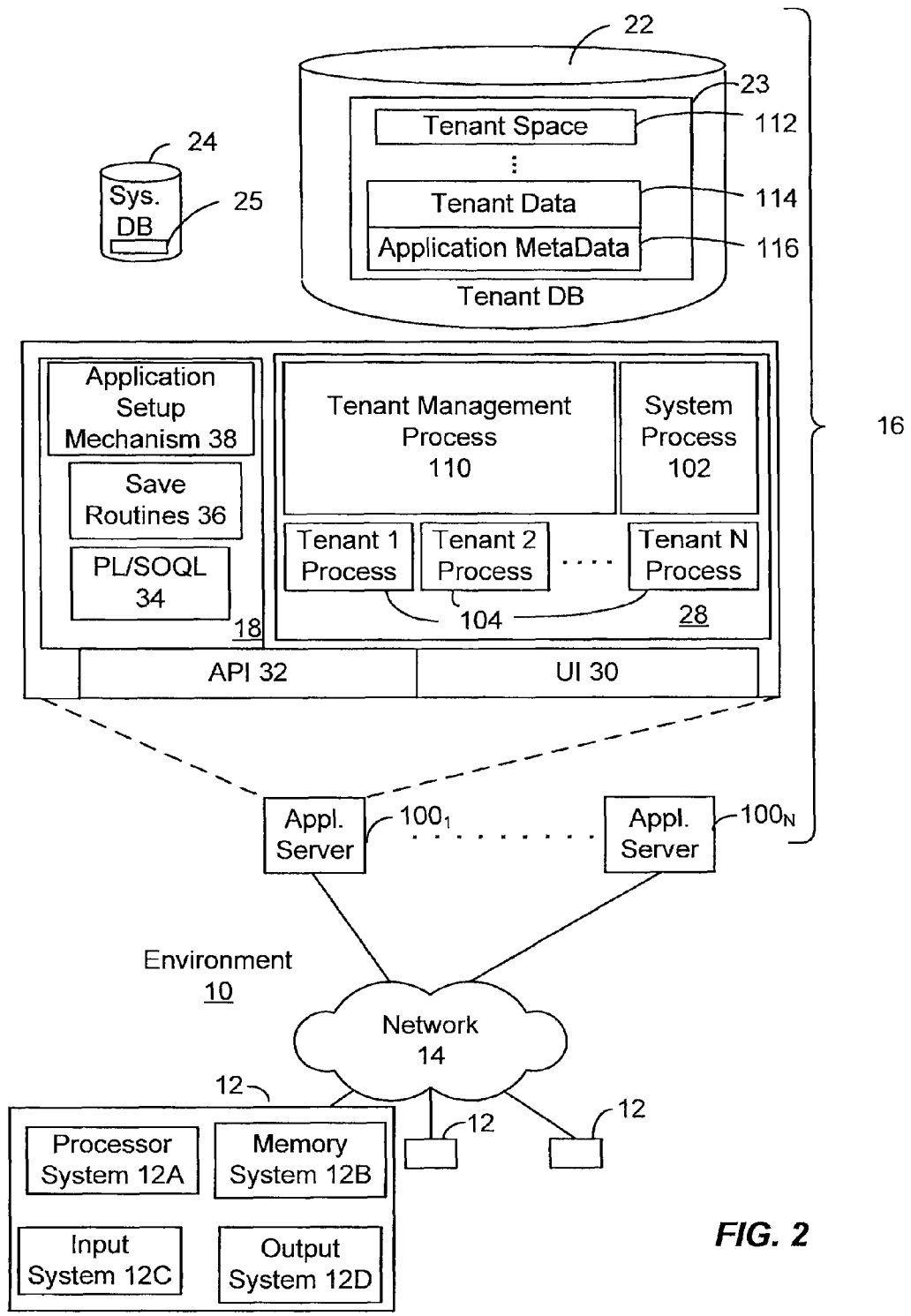
FIG. 2 illustrates a block diagram of an embodiment of elements of FIG. 1 and various possible interconnections between these elements.

FIG. 2 also illustrates environment 10. However, in FIG. 2 elements of system 16 and various interconnections in an embodiment are further illustrated. FIG. 2 shows that user system 12 may include processor system 12A, memory system 12B, input system 12C, and output system 12D. FIG. 2 shows network 14 and system 16. FIG. 2 also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers $100_1$-$100_N$, system process space 102, tenant process spaces 104, tenant management process space 110, tenant storage area 112, user storage 114, and application metadata 116. In other embodiments, environment 10 may not have the same elements as those listed above and/or may have other elements instead of, or in addition to, those listed above.

User system 12, network 14, system 16, tenant data storage 22, and system data storage 24 were discussed above in FIG. 1. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 2, system 16 may include a network interface 20 (of FIG. 1) implemented as a set of HTTP application servers 100, an application platform 18, tenant data storage 22, and system data storage 24. Also shown is system process space 102, including individual tenant process spaces 104 and a tenant management process space 110. Each application server 100 may be configured to tenant data storage 22 and the tenant data 23 therein, and system data storage 24 and the system data 25 therein to serve requests of user systems 12. The tenant data 23 might be divided into individual tenant storage areas 112, which can be either a physical arrangement and/or a logical arrangement of data. Within each tenant storage area 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage area 112. A UI 30 provides a user interface and an API 32 provides an application programmer interface to system 16 resident processes to users and/or developers at user systems 12. The tenant data and the system data may be stored in various databases, such as one or more Oracle™ databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server 100₁ might be coupled via the network 14 (e.g., the Internet), another application server 100_{N-1} might be coupled via a direct network link, and another application server 100_N might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain embodiments, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one embodiment, therefore, an interface system implementing a load balancing function (e.g., an F5 Big-IP load balancer) is communicably coupled between the application servers 100 and the user systems 12 to distribute requests to the application servers 100. In one embodiment, the load balancer uses a least connections algorithm to route user requests to the application servers 100. Other examples of load balancing algorithms, such as round robin and observed response time, also can be used. For example, in certain embodiments, three consecutive requests from the same user could hit three different application servers 100, and three requests from different users could hit the same application server 100. In this manner, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain embodiments, user systems 12 (which may be client systems) communicate with application servers 100 to request and update system-level and tenant-level data from system 16 that may require sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It may be understood that "table" and "object type" may be used interchangeably herein. Each table generally contains one or more data categories logically arranged as columns or fields in a viewable schema. Each row or record of a table contains an instance of data for each category (type) defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, Opportunity data, and other object types, each containing predefined fields. It may be understood that the word "entity" may also be used interchangeably herein with "object" and "table", when entity or object is referring to a collection of objects or entities of a particular type.

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

III. Matching and Tethering Records

Figure 3:
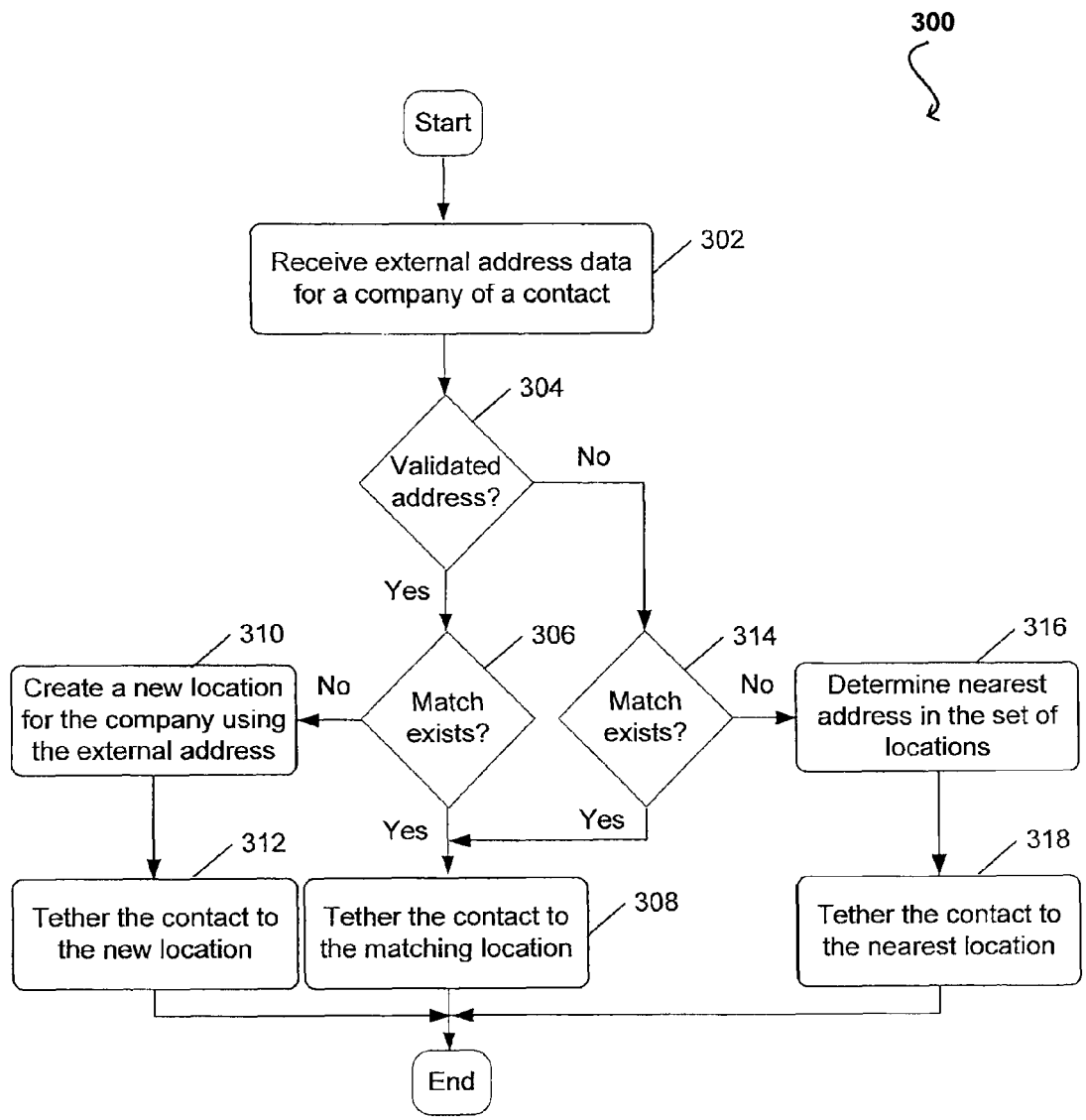
FIG. 3 illustrates an example process of some embodiments for tethering a contact to an existing location of a company in a database system upon matching an external address of the contact to the address of the existing location.

FIG. 3 illustrates an example process 300 of some embodiments for tethering a contact to an existing location of a company in a database system upon matching an external address of the contact to the address of the existing location. It should be understood that additional, fewer, or alternative steps can be utilized in similar or different orders, or in parallel, unless otherwise stated, within the scope of the various embodiments.

As shown in FIG. 3, external address data for a company of a contact is received at 302. In some embodiments, data for a new contact is received, the data including an address for a company of the contact. For instance, when a user is signing up for an account online, information relating to the user such as the user's company and the user's company address may be received from the user. Some embodiments receive a new address for a company that includes multiple locations, the company being part of a database system. In some embodiments, a determination is made as to whether to update the company's locations with the new address by comparing this newly received address with the addresses that are already part of the database system.

In process 300, a determination is made as to whether the received address data is validated at 304. Some embodiments utilize a third party validation service/software to validate the data received from the user. In some embodiments, validating a received address through a third party vendor (e.g., QAS) enables one to determine whether the address is a valid and existing address. Some third party address validation vendors correct minor typos in the received addresses in addition to validating the address. In some embodiments, the validated data/address is received in a normalized format. For instance, the third party vendor may return a normalized address of 23 Ames St after validating the received address of 23 Ames Street. Further, some embodiments deem the external address to be of sufficiently high quality when the address is validated (e.g., by the third party vendor). In some embodiments, an address is considered to be of sufficiently high quality when there are few typographical errors in the spelling of the address fields and/or the terminology usage is current (e.g., using Mumbai instead of Bombay for city name).

In this example, a determination is made as to whether a match exists when the received address is validated at 306. In some embodiments, upon determining that the received address is validated, the address pair (i.e., the external address and the validated address) is stored for learning in a learned knowledge table that is further described below. Some embodiments match the received address with existing addresses within a database system. In some embodiments, the external address is received from a user who is part of a particular company. Some embodiments then determine the existing locations/addresses in the database system that corresponds to the particular company. In order to integrate related information, some embodiments perform a matching between the received external address and the existing address(es) in the database system corresponding to the particular company.

In some embodiments, a company has multiple locations and corresponding addresses stored within a database system. One or more business contacts are tethered to each company location in some embodiments. In order to tether a new contact with an appropriate company location, some embodiments perform a matching between the address received from the new contact or the external address with one or more locations of the specified company. Since there may be several ways to express the same location, some embodiments perform fuzzy matching to determine whether there is a match. Without performing fuzzy matching, some embodiments may not be able to determine that there is a match between the external address and one of the addresses of the specified company in the database albeit the addresses representing the same location (e.g., because of aliases, misspellings, incorrect address field specified by the new contact). Using fuzzy matching techniques enables some embodiments to identify and match addresses that represent the same location regardless of aliases, spelling mistakes, incorrect address field input, abbreviations, etc.

In process 300, the contact is tethered to the matching location at 308 upon determining that a match exists between the external address (i.e., received from user input) and one of the locations of the user's company indicated in the database. In some embodiments, tethering the contact to the matching location enables the contact to be associated with the matching location for the company in the database system. A new location for the company is created at 310 using the external address upon determining that a match does not exist between the external address and the locations of the user's company. Upon determining that there is no match, some embodiments update the database by adding a new location for the company in the database using the external address. The contact is then tethered to the new location at 312. Upon tethering the contact to the new location, some embodiments enable the contact to be associated with the new location of the company within the database.

Returning to 304 in process 300, a determination is made as to whether a match exists upon determining that the external address is not validated at 314 (e.g., through a third party vendor). Although the external address may not be validated (e.g., by a third party vendor), some embodiments perform fuzzy matching techniques on the external address of a user against a set of addresses for the user's company stored in the database to determine whether there is a match.

In some embodiments, the external address may not be validated because a third party vendor does not have coverage for address validation in a particular area that includes potential areas to which the external address may be directed. The third party vendor of some embodiments may not have the most current database of valid addresses in each area (e.g., a country). While some databases have a large coverage, the cost of maintaining the databases of valid addresses and keeping the addresses current is prohibitively high in some embodiments. Some validation services may not be able to map the external address received by the user to a unique valid address with high confidence because of its inability to map severely incomplete or erroneous external addresses. Some embodiments may use fuzzy matching techniques to perform and determine a match regardless of the external address having not been validated.

In the process 300, the contact is tethered to the matching location upon determining that a match exists at 308. The match may be determined by fuzzy matching techniques using learned knowledge, which is further described below. When a determination that a match does not exist is made at 314, a determination of the nearest address in the set of locations of the company in the database is made at 316. Some embodiments perform proximity matching techniques to determine the nearest address in the set of locations to the external address. In some embodiments, performing proximity matching techniques includes determining an approximate distance between the external address and each of the set of locations of the company in the database. Proximity matching of some embodiments determines the location within the set of locations that has the shortest distance to the external address. Some embodiments determine the location within the set of locations that is closest distance-wise to the external address by comparing an address field (e.g., a city, a state). For instance, if the two addresses or the address pair shares the same city and/or state, then some embodiments may determine that this address is the address within the set of addresses that is closest to the external address. Upon determining the nearest address in the set of locations, the contact is tethered to the nearest location with the nearest address at 318.

Figure 4:
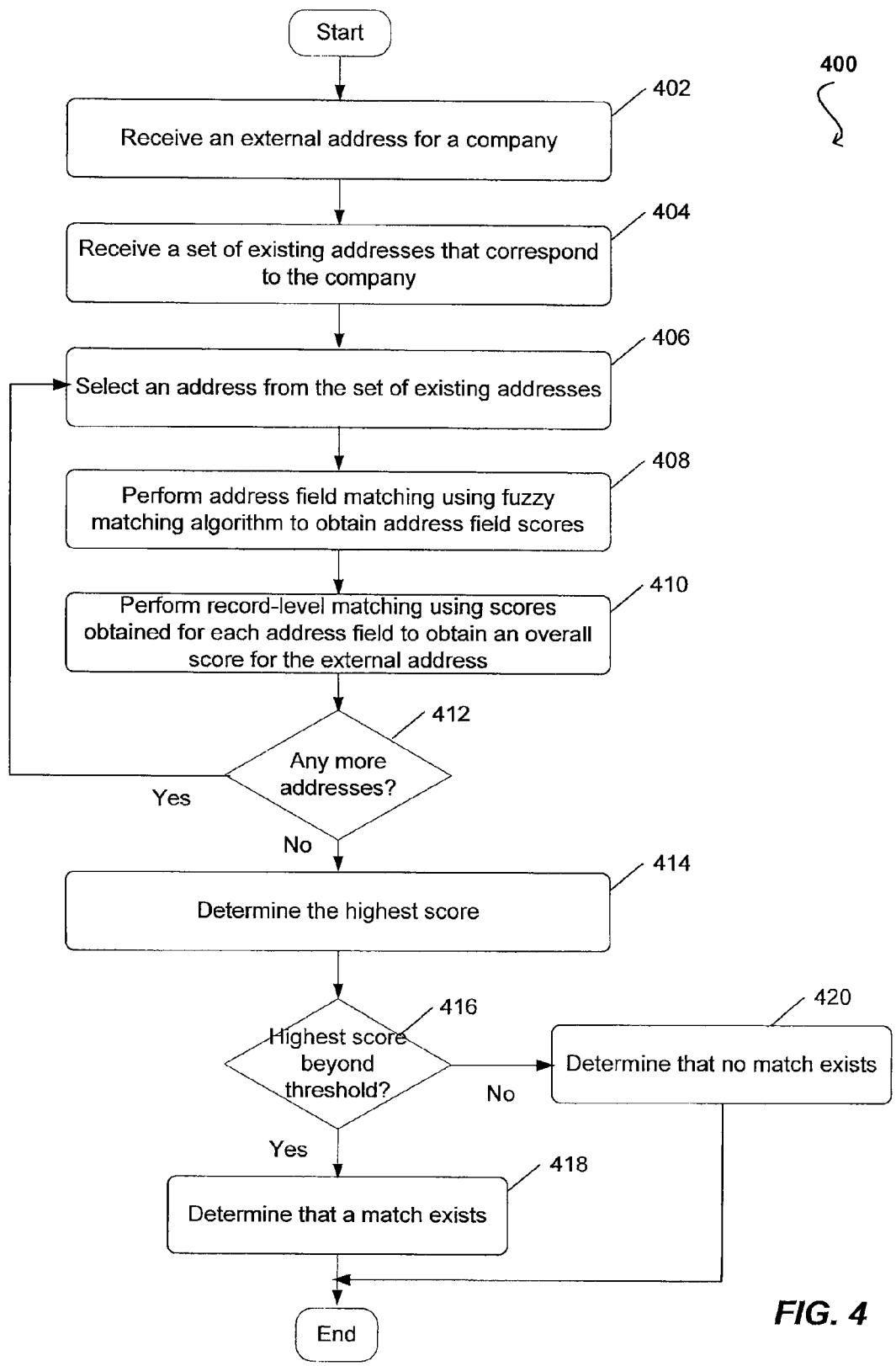
FIG. 4 conceptually illustrates a process of some embodiments for determining whether a match exists between an external address (e.g., an address input from a user) and one of a set of addresses using fuzzy matching techniques.

FIG. 4 conceptually illustrates a process 400 of some embodiments for determining whether a match exists between an external address (e.g., an address input from a user) and one of a set of addresses using fuzzy matching techniques. Some embodiments perform fuzzy matching on a pair of addresses in order to determine whether the pair of addresses is referring to the same location. When the system determines that a pair of addresses is referring to the same location, the system of some embodiments merges or integrates the records such that repetitive information in the database is avoided or discarded. Some embodiments merge or integrate the records by selecting an address between the pair of addresses that has a higher quality (e.g., fewer spelling errors, conventional usage of words, etc.) and then discarding the non-selected address. In some embodiments, the records are merged by selecting an address from the pair arbitrarily (e.g., when the quality of the addresses is not compared or determined).

In process 400, an external address is received at 402. In some embodiments, the received address is designated by a user as an address for a particular company. A set of existing addresses that correspond to the company is received at 404. In some instances, a company has one or more corresponding locations in a database system. In some embodiments, the system obtains access to the set of existing addresses such that a comparison of the address fields may be performed. An address from the set of existing addresses is selected at 406. In some embodiments, each address is selected to perform a match against the external address received from the user such that a best match among the set of addresses with the external address may be determined.

Next, address field matching is performed using one or more fuzzy matching techniques (e.g., a set of scoring algorithms or processes) at 408 to obtain a field match score for each address field. Some embodiments parse each address into multiple address fields. For instance, an address may be parsed into multiple fields including a street field, a city field, a state field, a zip field, a country field, etc. In some embodiments, address field matching includes matching each address field of the external address with each address field of the selected address from the set of existing addresses in the database for a particular company. Some embodiments match the address fields by scoring each pair of address fields using a scoring algorithm. In some embodiments, the scoring algorithm is a type of fuzzy matching where a field-match score for a pair of address fields that may not be completely the same (e.g., spelled the same) can be obtained. Using fuzzy matching enables a system to determine that there is a match between two address fields (i.e., the two address fields are representing the same location, place, number, etc.) even when the appearance of the address fields may not be the same (i.e., there are misspellings in one field, they are aliases of each other, etc.).

The scoring algorithm uses learned knowledge in some embodiments when obtaining a score for each address field pair. Learned knowledge of some embodiments is stored in a learned knowledge table that includes a set of alias pairs (e.g., alias-normalization pairs) where address field pairs (e.g., city field pair, zip field pair) or a portion of an address field pair (e.g., a portion of a street field pair) that are identified to be equivalent or aliases are stored. In some embodiments, learned knowledge includes information about alias pairs. For example, learned knowledge for an address field alias pair may include a value from which a confidence level may be calculated, the confidence level indicating how frequent and therefore how likely the address field pair matches and is an alias.

Some embodiments construct the learned knowledge table and populate the learned knowledge table with alias pairs by using training sets or data sets. A training set of some embodiments is an address pair including a raw external address and a validated and/or normalized address (e.g., performed by a third party vendor). Some embodiments may then extract alias pairs for the different address fields or portions of the address fields by identifying address fields or portions of address fields within the training set that do not appear the same (e.g., Bombay and Mumbai are not spelled the same) but are identified to be the same or validated. For example, the system of some embodiments includes an additional address field alias-normalization pair in the learned knowledge table when an address is validated by a third party vendor and the returned address is different (e.g., normalized, misspellings corrected, aliases identified) from the original address.

In some embodiments, some alias-normalization pairs are hardcoded into the learned knowledge table. Some embodiments may determine how confident an address field pair or a portion of an address field pair is an alias (e.g., a confidence level) by determining the frequency that this verification or validation of this alias pair has been performed (e.g., by a third party vendor) or the number of times this alias pair has appeared in training sets. Some embodiments increment a value every time the system determines that a particular address field alias-normalization pair exists in a training set and determines a confidence level for that particular pair by calculating a percentage using the value. For instance, if an alias-normalization pair appears in a training set or multiple training sets several times, a confidence level for the pair to be deemed as a match or an alias pair is higher.

The scoring algorithm in some embodiments performs matching logic to determine a score for each address field pair. The matching logic determines a score for each address field pair by tolerating some spelling errors, penalizing for numeric differences as opposed to non-numeric differences, etc. Each address field may have a different set of matching logic that needs to be performed to determine a score for that address field pair. Some embodiments determines a higher score between the field-match score derived from the scoring algorithm that uses learned knowledge and the field-match score derived from the scoring algorithm using matching logic. In some embodiments, if the address field pair is an alias of each other, then the match may be deemed as 100%. In this instance, the higher score would be 100% or 1 for an alias pair.

In process 400, record-level matching is performed at 410 using the field match score for each address field to obtain an overall address match score for the external address and the selected address from the set of existing addresses. Some embodiments use a record-level matching algorithm that uses the field match scores of the various address fields to obtain an overall address match score. This assigns an address match score to a pair of addresses (i.e., the external address and the received address) or the address pair. Some embodiments determine that the address pair is a match if the calculated and assigned address match score is high (e.g., beyond 60%) and that the address is a mismatch if the address match score is low (e.g., below 50%).

A determination is made as to whether there are any more addresses in the set of addresses at 412. In some embodiments, the external address is matched with each address in the set of addresses that correspond to the company in the database. Some embodiments perform the matching between the external address and a portion that is less than all of the set of addresses in the database. For instance, some embodiments match the external address with addresses within the set of addresses that share a same address field (e.g., share a country, share a state, share a city). In some embodiments, if no sufficiently good match is found when matching the external address with addresses within the set of addresses that share same address field (e.g., a zip code), then some embodiments match the external address with addresses within the set of addresses that share an address field that may include a larger subset (i.e., from specific search to a broader search). For example, there may be a larger subset of addresses within the set of addresses that the external address may be compared against when the subset of addresses that share the same country (e.g., ten or twenty locations) as the external address is selected as opposed to the city being selected (e.g., only one or two locations).

As some companies may have too many corresponding locations, some embodiments may use a time-out when too much time has been spent seeking a match to the external address. In some embodiments, upon determining that there are more addresses within the set of addresses for comparison with the external address, the process returns to select (at 406) another address from the set of existing addresses. Upon determining that there are no more addresses that need to be matched with the external address, some embodiments determine (at 414) the highest score from the scores derived for each address pair. In some embodiments, the address pair with the highest score is determined to be the address pair that matches the best.

A determination is made as to whether the highest score is beyond a threshold at 416. In some embodiments, even the address pair with the highest score may not be a good enough match. Some embodiments therefore determine whether the highest score exceeds a threshold value (e.g., above 60%). In some embodiments, the threshold value is preset by a developer or a third party. If the highest score is beyond the threshold, a match is determined to exist at 418. However, if the highest score is not beyond the threshold, no sufficiently good match is determined to exist at 420.

Figure 5:
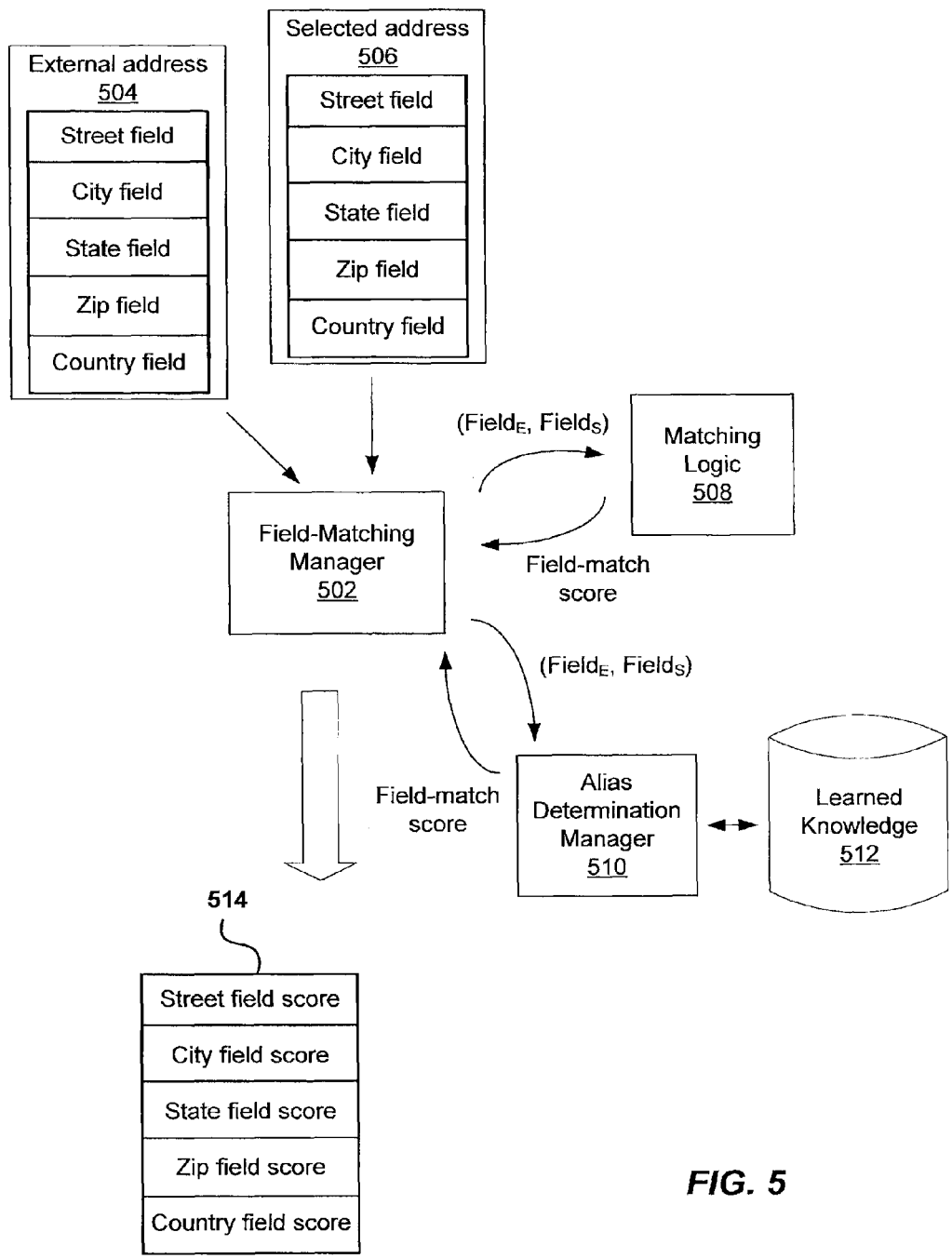
FIG. 5 illustrates an field-matching manager that determines a field-match score for each address field (e.g., street, city, state, zip, country, etc.) of an address pair (e.g., the external address and a selected address).

FIG. 5 illustrates an field-matching manager 502 that determines a field-match score for each address field (e.g., street, city, state, zip, country, etc.) of an address pair (e.g., the external address and a selected address). FIG. 5 will be described by reference to FIG. 6, which conceptually illustrates an example of a learned knowledge table of some embodiments from which a system may utilize in obtaining a field-match score. Some embodiments use learned knowledge to determine that an address field pair is an alias, an abbreviation, etc. and therefore a match in terms of the location the address field represents. As shown, the field-matching manager 502 receives a pair of addresses 504 and 506, each address including a plurality of address fields. In some embodiments, the field-matching manager actively retrieves, from a database, an address (e.g., a selected address 506) from a set of addresses corresponding to a company specified by a user. One or more address fields of an address may be empty in some embodiments.

When the field-matching manager 502 receives the pair of addresses, the field-matching manager 502 performs fuzzy matching (e.g., using one or more fuzzy matching techniques, processes, and/or algorithms) for the pair of addresses to determine a set of field-match scores 514 for the pair of addresses, or in other words, a field-match score for each address field of the address pair. Some embodiments may then compute an address-match score for the address pair using a record-level matching manager based on the various field-match scores for each of the address fields of the address pair. The record-level matching manager of some embodiments uses a set of algorithms to determine an overall match score for the address pair using the address field scores obtained from the field-matching manager.

The field-matching manager 502 performs one or more fuzzy matching techniques to derive a field-match score for each address field pair. In some embodiments, one of the fuzzy matching techniques includes using field fuzzy matcher 508 to apply matching logic to an address field pair (e.g., street field pair, state field pair, etc.). Depending on the type of address field, some embodiments apply different matching logic to the different address field pairs to derive a field-match score for the address field pair. In some embodiment, the matching logic accounts for some spelling errors, abbreviations, etc. For example, the city fuzzy matcher may tolerate spelling errors by detecting Sacremento from Sacramento and thereby assigning a high match score as the input was merely a spelling error. In this example, the field-matching manager 502 uses the field fuzzy matcher 508 to apply matching logic to an address field pair. The field fuzzy match 508 applies matching logic corresponding to the particular field (e.g., street field, city field) and returns a field-match score representing how well the two fields from the different addresses (e.g., the external address and the selected address) match.

In some embodiments, one of the fuzzy matching techniques includes using an alias determination manager 510 that leverages learned knowledge in deriving a field-match score for the address field pair. The learned knowledge may include aliases, abbreviations, and even common misnotions, misspellings, etc. In this example, the alias determination manager 510 receives an address field pair and determines a field-match score for the address field pair by determining a confidence level or a value from which the confidence level may be derived. In some embodiments, the confidence level indicating how likely an address field pair (or a portion of the address field pair) is an alias pair may be obtained through a value that represents the frequency that the field address pair (or a portion of the field address pair) has appeared in training sets (i.e., raw external address and validated address).

The learned knowledge table 512 of some embodiments includes the confidence level for an alias pair or a value from which the confidence level may be determined for the alias pair. In some embodiments, the learned knowledge table 512 is a table that is constructed using training sets that contain address pairs (e.g., (raw address, validated address)). Some embodiments add learned knowledge (e.g., an address field pair that may be an alias pair, increase a value that represents the frequency that an address field pair has been validated) to the learned knowledge table when an address validation service verifies an input raw address and returns a validated address that is different from the original address. In such a case, the system has "learned" that an address field pair (or a portion of an address field pair) may be an alias pair (or alias-normalization pair) from the address pair (raw address, validated address).

FIG. 6 conceptually illustrates an example of a learned knowledge table 600 from which the alias determination manager 510 may determine a field-match score. The learned knowledge table 600 in FIG. 6 enables the alias determination manager 510 to determine the number of times that such an alias has been encountered by the system and then use the determined number of times to compute a field-match score that represents the confidence level that the address field pair is an alias, or a match. For instance, if the address field pair Bombay and Mumbai have been received, validated numerous times (e.g., by a third party address validation service), and listed in the learned knowledge table every time the system has encountered this address field pair, the confidence level indicating that Bombay is indeed an alias for Mumbai would be very high in some embodiments. Some embodiments determine a count for the number of times the alias pair appears in the learned knowledge table and converts this count to a confidence level between zero and one, which would be the field-match score.

As shown in the learned knowledge table 600, the table includes a number of different types of parameters 602-610, each type of parameter representing a different type of address field—in this case, the first type of parameter 602 is for street fields, the second type of parameter 604 is for city fields, the third type of parameter 606 is for state fields, the fourth type of parameter 608 is for zip field, and the fifth type of parameter 610 is for country field. One of ordinary skill in the art will recognize that the learned knowledge table of some embodiments may include additional types of parameters and additional information for each type of parameter (e.g., a confidence level that a particular address field pair is or contains an alias) than those shown in this example.

Under each type of parameter in the learned knowledge table 600, alias pairs are provided in each entry pair 612 (there are a set of entry pairs for each type of parameter as shown in this example). In some embodiments, alias pairs include different ways to express the same thing or location and are functionally equivalent ways to describe the thing or location. For instance, Bombay and Mumbai are both referring to the same city but are simply different expressions of the same location. Some embodiments hardcode alias pairs into an entry pair of the learned knowledge table. The system of some embodiments includes alias pairs in the learned knowledge table by extracting one or more alias pairs for one or more address fields from training sets where each training set includes an external (raw) address and a validated address (e.g., validated through a third party validation service).

In some embodiments, when a raw address is validated (e.g., through a third party validation service), the system compares the validated, normalized, and differently-expressed address with the raw address. Some embodiments determine that the raw address and the validated address is a training set pair when one or more address fields (e.g., city field, zip field) or a portion of one or more address fields (e.g., a portion of the street field) is different. The system of some embodiments extracts one or more alias pairs from the training set pair.

Some embodiments determine whether an alias pair already exists in the learned knowledge table (i.e., has previously been added to the table). In some embodiments, the one or more alias pairs are added to the learned knowledge table and given a value (e.g., one) to indicate the frequency that the alias pair(s) appears (in raw and validated addresses). Some embodiments update a frequency or value field in the learned knowledge table from which a confidence level that indicates how certain that an address field pair or a portion of an address field pair is an alias may be obtained. For example, a high frequency or a high number in the value field that indicates the number of times that this address field pair has appeared (e.g., 2000 times) may indicate a high confidence level (e.g., closer to 1 than 0, above 0.5) that this address field pair is an alias. Although the learned knowledge table 600 illustrated here includes mostly alias pairs, the learned knowledge table of some embodiments includes functional equivalents of abbreviations, common misnotions, misspellings, etc. in addition to aliases. For the street field, the learned knowledge is the alias-normalization pairs embedded within the matching street pairs.

In some embodiments, all the aliases other than the country field are in the context of a specific country. Some embodiments determine the country field of an external address before determining whether the other fields (e.g., street field, city field, etc.) contain aliases. This allows the determination of aliases in the other fields to be more accurate since different countries may have different usage for notations, spellings, etc. For instance, when determining whether an address from Italy includes aliases in its various fields other than the country field, some embodiments determine the country to which this address is referring (i.e., Italy), and then uses the learned knowledge table, or entries within the learned knowledge table that correspond to Italy, to derive a confidence level for potential aliases within the various address fields other than the country field (e.g., Pza→Piazza within the street field).

Returning to FIG. 5, the alias determination manager 510 determines a field-match score for an address field pair received from the field-matching manager 502 using the learned knowledge 512. By determining the number of times the field pair appears in the learned knowledge table 512, the alias determination manager 510 is able to compute the field-match score using a set of algorithms (e.g., $\tan h(n/c)$, where n is the number of occurrences of this pair in the training set and c is a constant greater than or equal to 1), the field-match score representing the confidence level that the address field pair is a match (e.g., an alias, an abbreviation). In some embodiments, the more times that the address field pair appears in the learned knowledge table, the higher the confidence level that the address field pair is a match (e.g., an alias, an abbreviation).

In FIG. 5, when the field-matching manager 502 receives the field-match scores from the various fuzzy matching techniques performed on the address field pair, the field-matching manager determines the highest field-match score for each field and provides a set of field-match scores 514 for the address pair. As mentioned above, some embodiments then compute an address-match score (e.g., using a record-level manager that is not shown here) for the address pair using the set of field match scores for the address pair. In some embodiments, the address-match score is a single score that represents how well the address pair matches (e.g., 1 for a complete match, and 0 for a complete mismatch).

Use-Cases, Applications, Generalizations

The above framework will easily accommodate Jigsaw, which maintains a database of global business contacts and companies that can be described as providing electronic business cards. A company can have multiple locations where an address for each of the company's locations is stored in the database. Individual contacts may be tethered to one of his or her company's locations in the database. The above framework provides the requisite global address matching in order to perform this tethering. Several use cases are described below:

One of the use cases is when data for a new contact is received, the data in which includes an address of the new contact. Some embodiments match the address to a best address in the Jigsaw database of the company of that contact. In some embodiments, the contact's address is made a new address of the company if the quality of the address is sufficiently good even if no sufficiently good match is found. Some embodiments discard the contact's address if the contact's address has poor quality (e.g., too many misspellings, too many empty fields, etc.) and tether the contact to the company's address that is (roughly) closest to the contact's address.

Another use case is when a new address for a company known to Jigsaw is received. Some embodiments compare this received address with the addresses of the known locations of this company to check whether the received address is referring to a new location not known to Jigsaw or matches one of the known locations of the company. A third use case is when a community member updates the location of a contact in the Jigsaw database. In some embodiments, this update enables the system to perform address matching which may trigger a match to an address already known to Jigsaw.

Some embodiments limit the use cases described above or the address matching to matching an external address with one or more addresses of the same company (e.g., specified by the user). In some embodiments, when the system is only matching against addresses of the same company, the objective is to air on the side of over-matching rather than under-matching since the cost of a missed match is high. The risk that a match is a false positive is low since the matching of the external address is only being performed against addresses of the user's company, as opposed to it being an open-ended match. In the instance where a contact is associated with the external address, some embodiments find the nearest address in the Jigsaw database for the contact's company and tether the contact to this address when no match is found and the external address is of poor quality (e.g., missing fields, grave misspellings, etc.)

In some embodiments, the address matching algorithm is described below:

Address Fuzzy Matching Algorithm—Determining the Best Match in the Set of Company Locations Given an external address e and a set A of addresses known to a database (e.g., the Jigsaw Database) for the company of e, some embodiments determine the address a* in A that matches e the best and return the score score(e,a*) of this match. Some embodiments then determine whether the score score(e,a*), which is the best match between the external address e and the set A of addresses, is a good enough match score such that the records may be merged or integrated.

In our approach, the key sub-problem in this problem is to be able to match a pair of addresses, i.e. given any two addresses a1 and a2, assign a score score(a1,a2) that quantifies how similar these two addresses are. Once we have such a score function, we can solve the original problem this way.

For each address a in A:

score_a_to_e=score(a,e)

end for
Find the a with the maximum score score_a_to_e and return (a,score_a_to_e)

In some instances, a large company can have thousands of corresponding locations: thousands of addresses in A. Instead of matching all addresses in A to e, some embodiments match only to a subset of A. Some embodiments select the subset by selecting all the locations within the set of locations that share a same address field as the external address (e.g. all in the same zip, or all in the same city, or all in the same state, or all in the same country). In some embodiments, this may be performed by the following:

Some embodiments define the notion of company location to be (company_id, address). That is, an address (street, city, state, zip, country) together with an identifier of a certain company form a company location. Defining a company location this way permits multiple companies at the same address to be distinguished from each others. Some embodiments may index all company locations in the Jigsaw database into the following indexes.

company_id,zip→addresses of company 'company_id' in zip 'zip'
company_id,city→addresses of company 'company_id' in city 'city'
company_id,state→addresses of company 'company_id' in state 'state'
company_id,country→addresses of company 'company_id' in country 'country'
company_id→All addresses of company 'company_id'

These indices, along with the addresses they index may be kept in distributed memory (memcached). Some embodiments maintain the size of the result set (number of addresses) of each key in each index. These 'size' data structures are not shown explicitly.

When users add a new external address for a specific company in the Jigsaw database, the company id of the external address e is known. For a given company id, a system of some embodiments is able to determine the corresponding addresses and the number of corresponding addresses. Some embodiments use the company_id index to fetch all the corresponding addresses if this number is 'very small' and match each of the corresponding addresses to e. In some embodiments, the system initially matches the hits (if any) to the most specific indices—(company_id,zip) and (company_id,city). If no sufficiently good match is found then the system of some embodiments matches the hits to a broader scope—to (company_id,state) and (company_id,country), potentially including more corresponding addresses. Some embodiments keep track of the ids of addresses that have already been matched to e during this process to avoid matching the same addresses again. As mentioned above, some embodiments use a timeout mechanism or abandon the search if too much time has been spent seeking a match to a given e.

Matching a Pair of Addresses—(1) Field-Level Matching

In some embodiments, both addresses (e.g., the external address and the one of the set of addresses for the same company) contain the following fields: street[1], city, state, zip, country, validation_status. Each field has its own fuzzy matcher in some embodiments. As described above, field fuzzy matching in some embodiments tolerates some limited spelling errors. Moreover, field matching exploits certain knowledge learned automatically from certain training sets. As described above, the field fuzzy matcher 508 applies matching logic to an address field pair where the matching logic applied depends on the type of address field.

[1] This really means address_line, which is not necessarily literally the street.

The street fuzzy matcher distinguishes between number matches and text matches such that number mismatches are penalized more heavily than text mismatches since it is more likely that a text mismatch may be a spelling error. For example (78 Mariner Blvd, 78 Marinor Blvd) may be assigned a higher match score than (78 Mariner Blvd, 77 Mariner Blvd). Some embodiments may also accommodate unmatched tails in address_lines. For example, the address field pair (78 Mariners Blvd, 78 Mariners Blvd 5$^{th}$ floor, room 25) is considered a reasonably high scoring match.

The street fuzzy matcher also leverages knowledge of aliases (e.g. St⇔ Street, Ave⇔ Avenue, etc.). In some embodiments, the knowledge is hardcoded into a learned knowledge table while some of the knowledge is automatically learned from training sets, especially knowledge for International settings (e.g. Strasse⇔ Str. in German addresses). In some embodiments, the algorithm may distinguish between numeric and non-numeric differences, where the former is penalized more heavily. Some embodiments may also match in the presence of common abbreviations (e.g. St⇔ Street) and uncommon ones (e.g. Prkwy ⇔ Parkway), fused words (e.g. SanMateo⇔ San Mateo), and acronyms (e.g. ibm⇔ International Business Machines), etc.

Some embodiments perform street fuzzy matching using learned knowledge. In some embodiments, the system uses a dynamic programming algorithm to align two address lines (streets) by aligning the tokens (words and numbers) in them and computes an overall score for such an alignment. In some embodiments, the match is accepted if the score exceeds a certain threshold, and rejected if not. The value of the threshold is determined from an evaluation set. Although terms such as "is low", "is not very high", "strongly match", etc. are used throughout the document, these various terms are made precise by using appropriate thresholds and checking whether the relevant scores are below or above them. These thresholds are all determined by examining the relevant scores on test sets of actual matches and (near-match) mismatches in some embodiments.

Consider matching "208 San Mateo Dr" and "208 San Mateo Drive". In this example, the prefix alignment would look like this: (208,208), (San,San), (Mateo,Mateo), (Dr, Drive). The first three aligned pairs contain identical tokens so each scores very high. The fourth aligned pair is (Dr, Drive) and this scores high because we have Drive→Dr as an alias→normalization pair in our dictionary (hard-wired or learned). The alignment thus has a very high overall score, which results in the decision that these two address lines match. This example is further described below under the learned knowledge section.

The city fuzzy matcher mainly tolerates some spelling errors (e.g. Sacramento⇔ Sacremento is detected). The state fuzzy matcher accommodates some spelling errors (e.g. California⇔ Calfornma) and also matches on aliases (e.g. California⇔ CA). The city and state fuzzy matchers both use the Levenshtein algorithm [2] to match in the presence of spelling errors.

The zip fuzzy matcher tolerates some proximity variations in zips (e.g. 93256 is considered similar to 93252), some spelling/transposition errors (e.g. 93256 and 39256), some minor differences that cut across countries (e.g. 1-12345, 112345, and I 12345 are all considered pairwise likely matches). The zip fuzzy matcher may also model country-specific patterns. For example, US zips 12345-6789 and 12345 are considered moderately high-scoring matches (the 5 digit zips are the same). In some embodiments, the patterns for other countries are learned automatically from a training set, and used in the matching.

Learned Knowledge

The address matching system of some embodiments as described above includes a learning component that automatically learns certain knowledge from a training set. In some embodiments, the field-matching manager uses learned knowledge to perform the matching. It is important to utilize a learning component for matching, especially when the matching may be performed on a global scale. In some embodiments, the learning component uses a training set of pairs (raw address,validated address) that may be obtained through an address validation service. The address validation service of some embodiments verifies a raw address and returns a validated address. In some embodiments, when the validated address is different in some way from the original address, the system adds the pair (raw address, validated address) to the training set.

In some embodiments, a training set in a learned knowledge table may be described as records of the form country, field_name, original value, validated value, score. Below are examples of a few 'knowledge records' learned automatically.

| country | field_name | original value | validated value | score |
|---|---|---|---|---|
| INDIA | city | bombay | mumbai | 15 |
| REPUBLIC OF MOLDOVA | zip | md-2023 | 2023 | 2 |

In the first example, the learned knowledge is that the city Mumbai in India is also known as Bombay. In the second example, the learned knowledge is that the zip 2023 is sometimes expressed as md-2023. The score reflects the confidence in the alias→normalization. For example, the confidence that Bombay is indeed an alias for Mumbai, as a city in India, should be very high. Some embodiments maintain a count of the number of times an alias→normalization pair is seen in the learned knowledge table. The confidence level as described above is determined using the count of the alias pairs. Some embodiments also learn general rules from the learned aliases. For example, some embodiments may infer a rule (md-<4 digits>,<4 digits>) from seeing many learned pairs such as these: (md-2023,2023), (md-1234,1234) in the learned knowledge table.

Some embodiments perform a limited form of learning of such general rules. In some embodiments, the system restricts the learning to the zip field. For instance, consider the subset of records R(c)=(country=c, field-name=zip, original_value, validated_value, score) in which original_value does not equal validated_value. In such an instance, R(c) is specific to country c. Some embodiments take one pass over this set of records and blur each original_value and each validated_value by converting all digits to the character 'd'. In this example, the zip 'md-2023' would thus get blurred to the zip 'md-dddd'. Some embodiments then treat each blurred-original-value→blurred-validated-value as an occurrence of an (blurred) alias→normalization pair. In such an instance, this is as if the score of every record in R(c) had been set to 1. Some embodiments do this such that the count of such blurred pairs (which determines the confidence of such a pair, hence the rule) is the number of different non-blurred alias→normalization pairs that formed this blurred pair, instead of the sum of the counts of these non-blurred pairs. The latter has the undesirable property that one high-scoring alias→normalization pair leads to a high confidence blurred rule while the former does not have this property.

The learning of aliases for terms in the street field is more complex in some embodiments. The algorithm of some embodiments automatically learns country-specific aliases used in street fields of addresses of that country from training sets. In some embodiments, the training set contains (raw_address,validated_address) pairs, from which we can get (raw_address.street, validated_address.street) pairs. For the street field, aliases (when present) are embedded in the street pairs: 208 San Mateo Drive Suite 235→208 San Mateo Dr Ste 220.

In order to extract the alias pairs Dr⇔Drive and Ste ⇔Suite from the street pairs, the algorithm first aligns the two streets using a dynamic programming alignment algorithm (described below) which aligns tokens (here words or numbers) in the two streets. Some embodiments discard unalignable tokens (or poorly aligned token pairs) in the right tails of the two streets. Such an alignment is called a prefix alignment. In this example, the prefix alignment would look like this: (208,208), (San,San), (Mateo,Mateo), (Dr,Drive), (Ste,Suite). The aligned pair (220,235) of the last tokens in each street was discarded in this case because it scored low (the suite numbers are different).

Next, some embodiments discard the identical aligned pairs, leaving (Dr,Drive) and (Ste,Suite). Although some embodiments may not conclude that (Dr,Drive) and (Ste, Suite) have high significance from one (raw_address,validated_address), if this pattern appears multiple times in the learned knowledge table after a larger number of entries and alias pairs are accumulated in the learned knowledge table, the aligned pairs (Dr,Drive) and (Ste,Suite) will appear often enough for a high significance to be assigned to them.

Every field-specific fuzzy matcher has the following form:

```
score_field_name(field_value_1,field_value_2) {
    score1 = <Based on matching logic for this field>
    # See section Matching a Pair Of Addresses
    knowledge_match_score =
    score_based_on_learned_knowledge(field_value_1,field_value_2)
    return [score1, knowledge_match_score].max
}
```

For the field street, some embodiments use the street fuzzy matcher to do the matching and scoring (e.g., using the algorithm described in the previous section). This fuzzy matcher uses both hard-wired and learned knowledge in some embodiments. Some embodiments define, for the fields city and state, score_based_on_learned_knowledge(field_value_1,field_value_2) to equal $\tanh(n/c)$, where n is the number of occurrences of the corresponding alias→normalization pair in the training set and c a positive constant $\geq 1$ which is tuned from an evaluation set.

Some embodiments compute two confidences for the field zip. The first one is exactly as described in the above paragraph. The second one blurs the two field values and computes the confidence of the corresponding blurred alias→normalization pair. The largest of the two is returned. In the example where the zip pair is (md-1234,1234), supposing that there is no alias→normalization pair corresponding to this in the learned knowledge table, the first confidence will be 0. When there are plenty of similar examples, i.e. md-<4 digits>→<same 4 digits> as training sets in the learned knowledge table, the second confidence will be high.

Matching a Pair of Addresses—(2) Record-Level Matching

In some embodiments, the overall matcher or the record-level manager as mentioned above assigns a match score to a pair of addresses. As mentioned above, the match score is high if the pair is deemed a match and low if the pair is deemed a mismatch. The matching algorithm of some embodiments may be described by the following:

In the above matching algorithm, the match is accepted only if the countries and streets are determined to match, and the zips or cities (or both) match. The match is also accepted if many fields match moderately, enough to rule out a chance false positive. The above algorithm by design does not require all fields to match in order to accommodate both errors and incomplete data. For example, if the two addresses being matched are (street=s, city=empty, state=empty, zip=z, country=c) and (street=s, city=c, state=st, zip=z, country=c), then since the street, zip, and country match, the two addresses are deemed to match even though the first one is missing city and state.

Proximity Matching Algorithm

As mentioned above, in the instance where a contact is associated with the external address, some embodiments find the nearest address (distance-wise) in the Jigsaw database for this company and tether the contact to this address when no sufficiently good match is found and the external address is not of sufficiently high quality. Some embodiments use a proximity matching algorithm to determine the nearest address in the set of addresses in the database to the external address.

Some embodiments assign a 'distance' to any two addresses a1 and a2 and compute the distance d(a,e) of every address a in the set to the external address e. The system of some embodiments then finds the a* that has minimum distance and returns it. In some embodiments, the notion of 'distance' is not Euclidean distance. Some embodiments ensures that the following property is satisfied, such that two addresses in different countries (states, cities, zips) should have a larger distance than two addresses in the same country (state, city, zip).

```
match_score(address1,address2) {
    # Returns score in [0,1] where 1 is perfect match, 0 is maximal mismatch.
    country_match_score = score_country(address1.country,address2.country)
    return 0 if country_match_score is low # countries mismatch
    street_match_score = score_street(address1.street,address2.street)
    return 0 if street_match_score is not very high # The streets don't match sufficiently
    well
    # At this point, both the countries and the streets match
    If the cities also strongly match or the zips also strongly match
        return 1;
    }
    If aggregated field_level match scores are sufficiently large {
        # This covers the case when neither the cities nor zips match strongly, but there is
        # enough evidence from multiple moderate level matches to deem this a match.
        # This could happen if the zips match moderately and the states match strongly.
        Return 1;
    }
    Return 0; # Insufficient positive evidence for a match
}
```

In order to compute the distance, some embodiments uses the field-level match scores computed when performing the address-field matching. The distance function is depicted in Ruby pseudo-code below:

```
distance(address1,address2)
    field_match_distances = [ ]
    [country,state,city,zip].each { |field_name|
        If address1.field_name && address2.field_name
            #Both addresses have non-empty values for this field
                If field_match_score is low
                    # field match scores were computed earlier and being reused
                    return MIS_MATCH_DISTANCE[field_name]
                else
                    field_match_distances << MATCH_DISTANCE[field_name]
                end
        end
    }
    return field_match_distances.min
end
Each of the above-used field names has two parameters:
MIS_MATCH_DISTANCE[field_name] and MATCH_DISTANCE[field_name]. These
parameters are set to respect the following constraints.
MISMATCH_DISTANCE[country]       > MISMATCH_DISTANCE[state]
MISMATCH_DISTANCE[state]         > MISMATCH_DISTANCE[city]
MISMATCH_DISTANCE[state]         > MISMATCH_DISTANCE[zip]
MATCH_DISTANCE[country]          > MATCH_DISTANCE[state]
MATCH_DISTANCE[state]            > MATCH_DISTANCE[city]
MATCH_DISTANCE[state]            > MATCH_DISTANCE[zip]
MIS_MATCH_DISTANCE[field_name] > MATCH_DISTANCE[field_name] for every
field_name
```

In this example, the algorithm determines the 'broadest' field (e.g., state is a broader field than city) that has non-empty values in both records (e.g., the external address fields and the selected address fields). Some embodiments return the mismatch distance of this field if the two values don't match and the process is terminated. For example, two records whose countries are different will quickly be assigned a large distance. Some embodiments add the match distance of this field to the array of match distances if the two values do match. Some embodiments then continue to look for an even narrower match. For example, the cities are next checked if the states match. Finally, some embodiments return the smallest of the collected distances if the processing exits the loop without encountering a return statement.

The Dynamic Programming Algorithm

Some embodiments use a dynamic programming algorithm to align pairs of tokens in (raw,verified) streets and extract from such an alignment alias→normalization pairs. In some embodiments, the dynamic programming algorithm aligns two sequences of tokens. Some embodiments score each token pair by using a plurality of scoring algorithms including a dynamic programming algorithm. As described above, some embodiments use parameters that penalize numeric mismatches more than non-numeric mismatches. In some embodiments, a term is developed in the dynamic programming algorithm that explicitly handles fused words and acronyms. Further, some embodiments score pairs of tokens are scored in a variety of ways, including character-level dynamic programming. This allows us to match prefixes, aliases, and unknown abbreviations to their corresponding expansions.

Let x and y denote the sequences of tokens (e.g., can be a word and/or a number) in the two streets. Let x and y contain m and n tokens respectively, and assume m≤n. (If not, swap x and y.) A matrix d is defined (m+1)×(n+1) and filled up 'bottom up' as follows. An (auxiliary) matrix p is defined and filled while d is being filled. This matrix, p, and its filling in and use are only needed for the learning use case of the present section. For the use case of a previous section (scoring how well two address lines, i.e. streets, match), it suffices to fill up d, as described below and compute the overall match spore from it.

$$d_{00} = 0$$

$$d_{i0} = -i*g, \quad j = 1, \ldots, m$$

$$d_{0j} = -j*g, \quad j = 1, \ldots, n$$

For $i > 0, \quad j > 0$ $$d_{ij} = \max \begin{cases} d_{ij-1} + g \\ d_{i-1j} + g \\ d_{i-1j-1} + s_1(x_{i-1}, y_{j-1}) \\ d_{i-1k} + s_2(x_{i-1}, y_{k\ldots(j-1)}), \quad k = 0, \ldots, j-2 \end{cases} \quad (1)$$

$$p_{ij} = \operatorname{argmax} \begin{cases} d_{ij-1} + g \\ d_{i-1j} + g \\ d_{i-1j-1} + s_1(x_{i-1}, y_{j-1}) \\ d_{i-1k} + s_2(x_{i-1}, y_{k\ldots(j-1)}), \quad k = 0, \ldots, j-2 \end{cases} \quad (2)$$

Note that the last 'term' in (1) is really j−1 terms. Here g>0 is an 'insert cost' parameter where the method in setting the value is described below. The modeling of inserts in the above algorithm is important. Without this, some embodiments may not be able to match an example such as CAPITAN to Capitan. Missing such a match could risk missing some genuine alias→normalization pairs. In some embodiments, the function $s_1$ scores two tokens for similarity, and returns a score between −1 and +1. This scoring has the following characteristics:

1. Known alias-normalization pairs score +1. For example if one of the tokens is 'St' and the other is 'Street'.
2. Learned alias-normalization pairs return the pair's confidence as a score. The set of these pairs is empty when learning begins. In one-pass learning, this set remains empty throughout. Multi-pass learning works as follows. The pairs learned in a pass, together with their counts, are added to the learned set. This learned set is then leveraged to find new pairs, or increase the confidence of existing ones.

3. The Smith-Waterman algorithm [4] is used to match tokens not covered by 1-2 above. This would score misspelled versions high, e.g. Avnue⇔Avenue. We use a substitution matrix that penalizes digit to different digit and digit to non-digit substitutions higher than non-digit to different non-digit substitutions. This algorithm returns a score s between 0 and 1 which is converted to being between −1 and 1 by the transformation 2s−1.

4. Abbreviation-expansion pairs are scored in a knowledge-free way, i.e. without having a dictionary of such pairs. As an example, 'St' would score somewhat high (even if this alias-normalization pair is not already known) against 'Street' because the 'S' and 't' in the former are at the two extremes of the latter.

5. If one token is found to be a prefix of the other, then the score $$\sqrt{\frac{m}{n}}$$

is returned. Here m and n are the lengths of the shorter and longer tokens respectively.

The function $s_2(x_{i-1}, y_{k \ldots (j-1)})$ scores the token $x_{i-1}$ against two strings formed from $y_{k \ldots (j-1)}$: the string formed by joining the tokens $y_{k \ldots (j-1)}$ and the string formed by joining the first characters of the tokens $y_{k \ldots (j-1)}$: $x_{i-1}$ is scored against these two strings using $s_1$, and the largest of these two scores is returned. Some embodiments perform the first scoring to cover fused words (e.g. SanMateo⇔San Mateo) and the second scoring to cover acronyms (e.g. ibm⇔International Business Machines). In (2), argmax identifies the cell whose value is used to compute $d_{ij}$. So if $d_{ij}$ was set to the first term in (1), $p_{ij}$ would equal (i,j−1), and if $d_{ij}$ was set to the third term in (1), $p_{ij}$ would equal (i−1,j−1). If $d_{ij}$ was set to some term in the fourth 'term' of (1), $p_{ij}$ would equal (i−1,k*) where k* is the value of k in that term.

Some embodiments set the insert cost parameter g from an evaluation set. Such an evaluation set is easy to assemble for a country whose street aliases are known (e.g. USA). In some embodiments, accurate tuning of g is not required. It is better to air on the side of setting g to higher than optimal than lower because g only comes into play when one of the addresses has missing tokens. There will be plenty of (raw street, normalized street) address pairs available from the 'field' in which both the raw and the normalized street have the same number of tokens, and they align in order, as is the case in our San Mateo example. So long as this is the case, alias→normalization pairs that are discoverable will indeed get discovered. Setting too low a value of g on the other hand risks false positive alias→normalization pair discoveries.

In some embodiments, an actual highest-scoring prefix alignment is recovered as follows. First, the cell (i*,j*) containing the largest value in the matrix d is found. Ties are broken arbitrarily. Next, some embodiments start from the cell $p_{i-j-}$ and iteratively trace-back an optimal path to the cell (0,0) using the 'back-pointers' in p. From such an alignment, alias→normalization pairs are discovered as described earlier.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an application-specific integrated circuit (ASIC). A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" may be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Moreover, unless specifically stated otherwise, the terms "first," "second," "third," and the like do not necessarily imply an order or sequence. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

It may be understood that any of the embodiments of the present invention can be implemented in the form of control logic using hardware and/or using computer software in a modular or integrated manner. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer program product (e.g., a hard drive or an entire computer system), and may be present on or within different computer program products within a system or network. A computer system may include a monitor, printer, or other suitable display for providing any of the results mentioned herein to a user.

Any of the methods described herein may be totally or partially performed with a computer system including a processor, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A computer-implemented method of linking a contact to one of a plurality of company addresses stored in a database system, the method comprising:
   receiving contact data for an individual, the contact data including the individual's name, a company name and a company address;
   determining whether the company address in the received contact data matches one of the plurality of company addresses stored in the database system in association with the company name;
   linking, using a processor, the individual's name to the matching company address stored in the database system; and
   storing the company address of the received contact data as a new company address for the company name in the database system when the company address of the received contact data does not match one of the plurality of company addresses stored in the database system in association with the company name, and linking the individual's name to the new company address in the database system.

2. The method of claim 1, the determining step further comprising using one or more fuzzy matching techniques by comparing the address in the received contact data with each company address in the database.

3. The method of claim 2, wherein each comparison yields a score corresponding to each address pair, each address pair comprising the address in the received contact data and a company address from the database.

4. The method of claim 2, wherein the step of comparing the address in the received contact data with each company address in the database comprises:
   comparing each address field of the address in the received contact data with each address field of each company address to obtain a first set of field match scores using a learned knowledge table;
   comparing each address field of the address in the received contact data with each address field of each company address to obtain a second set of field match scores using a matching logic; and
   determining a third set of field match scores by obtaining the higher score for each field between the first and second sets of field match scores, wherein the address in the received contact data is determined to match one of the plurality of company addresses when an overall address match score exceeds a threshold value, the overall address match score determined based at least in part on the third set of field match scores.

5. The method of claim 1, wherein the address in the received contact data comprises a plurality of address fields, each address field representing at least one of a street, a city, a state, a zip code, and a country.

6. The method of claim 1 further comprising:
   determining whether the address in the received contact data is verified by a third party vendor that provides address validation services.

7. The method of claim 1 further comprising:
   determining whether the address in the received contact data is validated, wherein the contact is capable of being linked to the one of the company addresses when the address in the received contact data is validated.

8. The method of claim 1, wherein the address in the received contact data is either partial or complete.

9. The method of claim 1, wherein the database system is a multi-tenant database system integrating the received address data into the database system.

10. A system for matching address data in a database system, the system comprising:
    one or more processors; and
    a non-transitory computer readable medium storing a plurality of instructions, which when executed by the one or more processors, cause the one or more processors to:
      receive contact data for an individual, the contact data including the individual's name, a company name and a company address;
      determine whether the company address in the received contact data matches one of the plurality of company addresses stored in the database system in association with the company name;
      link the individual's name to the matching company address stored in the database system; and
      store the company address of the received contact data as a new company address for the company name in the database system when the company address of the received contact data does not match one of the plurality of company addresses stored in the database system in association with the company name, and linking the individual's name to the new company address in the database system.

11. The system of claim 10, the instructions further comprising:
    determine whether the address in the received contact data is validated, wherein the individual's name is linked to a specific company address when the address in the received contact data is validated and matches the specific company address.

12. The system of claim 10, wherein the plurality instructions, when executed further cause the one or more processors to:
    determine whether the address in the received contact data is validated;
    determine a nearest address in the plurality of company addresses to the address in the received contact data; and
    link the individual to a specific company address when the address in the received contact data matches the specific company address.

13. The system of claim 12, wherein the instructions to determine the nearest address in the plurality of company addresses to the address in the received contact data comprises: instructions to determine a distance between the address in the received contact data and each company address in the database system.

14. The system of claim 10, wherein each company address comprises a plurality of address fields, and the instructions to determine a nearest location further causes the processor to use one or more fuzzy matching algorithms by to compare each address field of the address in the received contact data with each address field of the company addresses to obtain a field match score for an address pair comprising the address in the received contact data and the company address.

15. A non-transitory computer-readable medium containing one or more sequences of instructions executable by a processor in a computer to match address data in a database system, the instructions, when executed by the processor, cause the processor to:
    receive contact data for an individual, the contact data including the individual's name, a company name and a company address;
    determine whether the company address in the received contact data matches one of the plurality of company addresses stored in the database system in association with the company name;
    link the individual's name to the matching company address; and
    store the company address of the received contact data as a new company address for the company name in the database system when the company address of the received contact data does not match one of the plurality of company addresses stored in the database system in association with the company name, and linking the individual's name to the new company address in the database system.

16. The non-transitory computer-readable medium of claim 15, wherein each company address comprises a plurality of address fields, and the instructions, when executed by the processor, further causes the processor to use one or more fuzzy matching techniques to determine a weighted confidence score for at least one of a portion of the plurality of address fields, the weighted confidence score determined based on a frequency that the portion of the plurality of address fields has appeared in training sets.

17. The non-transitory computer-readable medium of claim 15, further including instructions to:
    determine whether the company address in the received contact data is validated by a third party address validation service; and
    receive validated address data from the third party address validation service when the company address in the received contact data is validated, wherein whether the company address in the received contact data matches one of the plurality of company addresses in the database system is determined using the validated address data.

18. The non-transitory computer-readable medium of claim 17, wherein the company address in the received contact data comprises a plurality of external address fields and the validated address data comprises a plurality of normalized address fields, the computer-readable medium further including instructions to:
    compare each external address field with a corresponding normalized address field;
    determine that the external address in the received contact data and the validated address is a training set pair when at least a portion of an external address field and a corresponding portion of a normalized address field are not expressed in a same way;
    determine a set of alias pairs from the training set pair, the set of alias pairs determined based on the portion of the external address field and its corresponding portion of the normalized address field; and
    store the set of alias pairs in a learned knowledge table.

19. The non-transitory computer-readable medium of claim 15, wherein the company address in the received contact data comprises a plurality of external address fields, wherein the instructions to determine comprises instructions to:
    calculate a plurality of field match scores for the company address in the received contact data and the one of the plurality of company addresses using learned knowledge; and
    calculate a record-level match score for the company address in the received contact data using the calculated field match scores, wherein the record-level match score indicates a weighted match score between the two addresses.

* * * * *